(12) United States Patent
Jancula

(10) Patent No.: US 7,266,684 B2
(45) Date of Patent: Sep. 4, 2007

(54) INTERNET THIRD-PARTY AUTHENTICATION USING ELECTRONIC TICKETS

(75) Inventor: Jeffrey John Jancula, Charlotte, NC (US)

(73) Assignee: Wachovia Corporation, Charlotte, NC (US)

( * ) Notice: Subject to any disclaimer, the term of this patent is extended or adjusted under 35 U.S.C. 154(b) by 937 days.

(21) Appl. No.: 09/924,712

(22) Filed: Aug. 8, 2001

(65) Prior Publication Data

US 2002/0023208 A1    Feb. 21, 2002

Related U.S. Application Data

(60) Provisional application No. 60/223,825, filed on Aug. 8, 2000.

(51) Int. Cl.
*H04L 9/32* (2006.01)
*H04L 9/00* (2006.01)
*G06Q 30/00* (2006.01)

(52) U.S. Cl. .............................. 713/156; 726/2; 726/3; 726/5; 713/176; 705/75; 705/76; 705/80

(58) Field of Classification Search ................ 713/200, 713/176, 156; 705/75–76, 80; 726/2–5
See application file for complete search history.

(56) References Cited

U.S. PATENT DOCUMENTS

| | | | | |
|---|---|---|---|---|
| 5,191,613 A | * | 3/1993 | Graziano et al. ........... | 713/176 |
| 5,794,207 A | * | 8/1998 | Walker et al. .................. | 705/1 |
| 5,892,904 A | | 4/1999 | Atkinson et al. | |
| 5,903,882 A | * | 5/1999 | Asay et al. .................... | 705/44 |
| 6,009,173 A | | 12/1999 | Sumner | |
| 6,122,625 A | * | 9/2000 | Rosen ......................... | 705/65 |
| 6,138,107 A | * | 10/2000 | Elgamal ....................... | 705/39 |
| 6,167,378 A | * | 12/2000 | Webber, Jr. .................... | 705/8 |
| 6,285,991 B1 | * | 9/2001 | Powar .......................... | 705/76 |
| 6,324,525 B1 | * | 11/2001 | Kramer et al. ................. | 705/40 |
| 6,341,353 B1 | * | 1/2002 | Herman et al. .............. | 713/201 |
| 6,363,365 B1 | * | 3/2002 | Kou ............................. | 705/64 |
| 6,367,009 B1 | * | 4/2002 | Davis et al. ................. | 713/166 |
| 6,477,513 B1 | * | 11/2002 | Walker et al. ................ | 705/76 |
| 6,539,424 B1 | * | 3/2003 | Dutta .......................... | 709/219 |
| 6,611,812 B2 | * | 8/2003 | Hurtado et al. ............... | 705/26 |
| 6,775,782 B1 | * | 8/2004 | Buros et al. ................. | 713/201 |
| 2001/0011255 A1 | * | 8/2001 | Asay et al. .................... | 705/76 |
| 2003/0177361 A1 | * | 9/2003 | Wheeler et al. ............ | 713/176 |
| 2006/0004670 A1 | * | 1/2006 | McKenney et al. ........... | 705/64 |

OTHER PUBLICATIONS

Bruce Schneier, Applied Cryptography, 1996, John, Wiley and Sons, Inc., Second Edition, pp. 183-184.*
William Stallings, Cryptography and Network Security, 1998, Prentice Hall, Second Edition, pp. 165-166.*
International Search Report of International Patent Application No. PCT/US01/24813.

* cited by examiner

*Primary Examiner*—Emmanuel L. Moise
*Assistant Examiner*—Minh Dieu Nguyen
(74) *Attorney, Agent, or Firm*—Kennedy Covington Lobdell & Hickman, LLP

(57) ABSTRACT

A method, software and apparatus facilitates one or more third-party agents to securely access a customer's or other first party's private personal and financial data or other such confidential information from a second party, preferably on the Internet. A security document or ticket is presented to the second party for verifying the customer's consent to grant such access to the third party. The second party only communicates such confidential information to the third party if the security document is found to be valid. The security document, which can be at least partially encrypted, can also include a preselected expiration time, beyond which it is not valid.

79 Claims, 7 Drawing Sheets

Detailed Ticket Granting & Use Flowchart

Detailed Ticket Granting & Use Flowchart

Detailed Ticket Granting & Use Flowchart

Detailed Ticket Granting & Use Flowchart

Detailed Ticket Granting & Use Flowchart

Customer Screen Prompt for New Ticket

Simplified Flow of Ticket Request, Approval and Usage

INTERNET THIRD-PARTY AUTHENTICATION USING ELECTRONIC TICKETS

CROSS-REFERENCE TO RELATED APPLICATIONS

This application is entitled to the benefit of, and claims priority to, U.S. Provisional Patent Application Ser. No. 60/223,825, filed Aug. 8, 2000 entitled "INTERNET THIRD-PARTY AUTHENTICATION USING ELECTRONIC TICKETS."

BACKGROUND AND SUMMARY OF THE INVENTION

The invention relates generally to computer information security and the Internet, and more specifically to methods that permit one or more third-party agents to access customers' private personal and financial data or other confidential information on the world-wide-web. The invention was originally designed as a method for banks and bank customers to mutually approve one or more third party agents (such as aggregators, for example) to access customer confidential data via the Internet. It is also applicable, however, in any situation involving computers where an agent's computer or computers act as an intermediary between computers of two other parties and where access to certain information is to be limited, whether or not the information is confidential.

The Consumer Problem

When the World Wide Web ("the web") was invented in 1990, security was not a major concern because it was primarily used to share scientific research. The initial concept was for unlimited, open, public access to documents. As the web became popular, however, the need for security increased. Web sites developed schemes with usernames and passwords to protect confidential web pages. And, in 1995, SSL encryption became the standard method to protect confidential data transmitted over the public Internet. By 1999, consumers started to become confident in the security of Internet transactions, and Internet commerce became commonplace. Millions of consumers regularly made purchases, paid bills and performed common banking and brokerage transactions using the Internet.

Today, a typical consumer might have access to dozens of secure web sites for shopping and financial services. Because each site has a unique look and feel, customers must learn how to navigate each individual site. Each site also has a unique security identification and authentication scheme, forcing each customer to keep track of dozens of usernames and passwords, PINs and code words. These factors may be confusing and frustrating for consumers. So, while the Internet revolutionized the way consumers access information, taking advantage of it is often difficult and cumbersome. Obtaining a consolidated view of a customer's Internet or on-line accounts could easily require hours of manual effort, working at a computer, visiting many web sites.

The Aggregator Solution

An aggregator is a web service that consolidates a consumer's financial and personal information and presents it in a concise, easy-to-read fashion. An aggregator accesses shopping and financial service web sites to extract customers' data and repackages that data for presentation on the aggregator's web site. After enrolling with an aggregator, customers only need to learn how to navigate the aggregator's web site. Furthermore, customers must remember only one username/password combination, instead of dozens.

The enrollment process typically involves setting up a username and password to access the aggregator's web site. This username/password becomes a very powerful "master password" because it gets linked to the customer's other accounts and passwords. In addition to creating master passwords, customers also enter details about each bank, brokerage and shopping web site they want the aggregator to access on their behalf. Details include usernames, passwords, account numbers and other secret or confidential information required to access aggregated web sites. (Not all aggregators know how to access all financial and shopping web sites, so the aggregator must support the bank, brokerage and shopping web sites a customer intends to use.) Once the aggregator has the information necessary to access all of a customer's accounts, however, the aggregator will work behind the scenes on the Internet to assemble the details about the customer's personal financial life or other confidential information.

When a customer visits the aggregator's web site, the aggregator will typically display a list of bank, credit card, brokerage, shopping and other financial accounts, along with associated balances, in a concise, consistent and consolidated fashion. The aggregator's site usually also has features to "drill down" into details about any account, showing transactions, history and trends. If the aggregator offers bill payment features, customers can also view on-line versions of bills and statements, including transaction details. Many aggregators also allow customers to schedule bill payments—where the aggregator moves money from customers' bank accounts to vendors or other accounts either electronically or by mailing actual checks. Since an aggregator may track uncleared transactions, the financial information kept by an aggregator may be more up to date than customer's account data at each bank, brokerage or vendor. An aggregator makes customers' on-line financial life much easier to manage. The aggregator is, in effect, a personal financial agent on the Internet.

How Do Aggregators Work?

Many aggregators use a technique known as "screen scraping" to access customers' information at various financial and shopping web sites. During screen scraping, the aggregator simulates a human and Internet browser accessing each web site. A computer program takes the place of a keyboard and mouse by supplying the expected input. Much like a human reading results on a screen, the computer program "reads" and stores the information returned by each aggregated site.

Screen scraping is not a perfect technology, however. If a web site changes its appearance or process flow, the aggregator may not be able to accurately obtain (or scrape) the information from the web site. Aggregators must constantly monitor aggregated web sites in an attempt to keep their computer programs current with each site.

In contrast, some aggregators have tightly coupled relationships with various financial institutions. This enables them to use more advanced techniques such as Interactive Financial Exchange (IFX), Open Financial Exchange (OFX) or eXtended Markup Language (XML), for example, to efficiently transfer account information. However, these techniques have not yet been widely adopted.

Risks of Aggregation

Many consumers recognize the benefits provided by aggregators, but feel uncomfortable providing aggregators unlimited access to passwords and other private information.

If the security at an aggregator's web site is compromised, unscrupulous parties could steal customers' private and confidential information and passwords.

When banks and other commercial web sites created their username/password schemes, they intended that only the consumer associated with each username know the secret password. In many cases, banks don't even store actual passwords. Instead, they store only a mathematically hashed value based on the password, which is enough information necessary to detect a valid password. In other words, many banks don't actually know a password, but they can determine if the customer really knows it. Storing password information in this manner reduces the likelihood of password theft by bank employees. This method also helps prevent password theft by Internet hackers.

When consumers provide passwords to an aggregator, they reduce the security and safety of their passwords because they are stored at an aggregator's computing facility in a reproducible form. Even if the aggregator stores encrypted passwords, this is less secure than a mathematical hash, because, unlike a bank, the aggregator can reproduce the original passwords. An aggregator's unscrupulous employee or an Internet hacker could exploit this risk and steal passwords.

Banks, brokerages and retail companies, for example, created their web sites with the intent that actual customers would access their sites. They didn't intend for aggregators' automated systems to extract customer data. The web sites' auditing and record logging mechanisms were originally intended to track actual customers initiating transactions. Commercial web sites need a way to audit and record accesses by aggregators distinctly from actual customers. These audit mechanisms should have a way to determine if a customer actually approved each aggregator's access.

If a customer discontinues the use of an aggregator, he or she would request the aggregator to disable their username and clear their personal information. However, this does not guarantee that the customer's confidential information has been removed. For a variety of legitimate reasons, or in the event of error, the aggregator might retain records of the customer's associated accounts, usernames and passwords. This retention might be temporary, but could even be permanent. The customer has no method to detect when an aggregator accesses his accounts, so they cannot easily feel confident that all access has been terminated.

The risks described here, plus financial liability and other regulatory risks, are roadblocks to widespread acceptance of aggregators by consumers, commercial web sites and government regulators.

Public Key Cryptography and Digital Certificates

Much of public key cryptography relies on unique properties of extremely large prime numbers (hundreds or more digits long) and a technique patented in 1983 by R. L. Rivest, A. Shamir, and L. M. Adleman. This technique, commonly known as RSA encryption (named for its inventors), allows any general-purpose computer to generate a pair of mathematically related numbers, known as encryption keys (or just "keys"), within a few seconds. Typically, one of the keys is called the private or secret key because the key owner must protect and secretly store the only copy of the private or secret key. The other number is called the public key because it can safely be shared with anyone.

Although the RSA methods can easily generate a key pair within a few seconds, the process to reconstruct a key pair is extremely difficult. If one key in a pair is lost, it could take the world's fastest computers many years to decompose the known key and recalculate the lost key. This disparity in decryption is the strength of public key cryptography. If someone has your public key, it is very difficult (almost impossible) for him or her to determine your private or secret key. If you have someone's public encryption key, you can use RSA's encryption techniques to encode a message or file that only that person can decrypt and read. The message recipient must have the private key (which is associated with the public key) and use RSA's decryption techniques to decode the message.

Conversely, if someone uses his or her private or secret key to encrypt some data or its digest, then anyone with access to that person's public key can decrypt the data or its digest back to its original form. Assuming that the originator protects his private or secret key, nobody else could have sent the original encrypted message—in effect a mathematical signature proves who originated the message. (Within the computer security industry, this exemplary security device is commonly known as a digital signature.)

The public and private or secret keys complement each other. If one of the keys encrypts (or locks) some data, the other complementary key decrypts (or unlocks) the data. Each customer, commercial web site and aggregator must have a unique public and private key pair. Rather than inventing methods to manage the storage of private keys and sharing of public keys, this invention relies on the existing public key infrastructure (PKI). With PKI, when an entity (person or company) creates a key pair, they register the public key with a certifying authority (CA). The CA verifies the identity of the entity and issues a digital certificate, which has been digitally signed by the CA.

The digital certificate serves as a tamper-resistant electronic identification document for an entity. The digital certificate includes the entity's public key. (Only the entity that generated the key pair should have access to the associated private or secret key.) Much of the software required to manipulate and store digital certificates and associated keys already exists as commercially available software. Most Internet web browsers and web servers have the capability to store digital certificates and keys, and software libraries, such a RSA's CryptoJ can perform public key cryptography. It is expected that this invention will be implemented using tools such as these, among others.

Although the technology exists, and the software is readily available, the use of digital certificates has not yet been widely adopted by consumers. By the year 2000, the United States federal government and many states approved the use of digital certificates and digital signatures as acceptable authentication mechanisms for public-to-government transactions. As public and commercial acceptance of digital signatures become commonplace, it is expected that most commercial institutions will either issue or otherwise assist customers to obtain digital certificates.

SSL Encryption

The Secure Sockets Layer (SSL) protocol was developed by Netscape Communications, Inc. as a way to securely move data over a public network, notably and typically over the Internet. SSL uses public key cryptography, specifically RSA's encryption methods, for example, to establish a secure "session" between two computers connected via the TCP/IP protocol. Public keys, usually obtained from digital certificates and associated private or secret keys may be used to identify (authenticate) one or both computers in a TCP/IP conversation. Once an SSL session is established, it is very difficult (almost impossible) for a third party to eavesdrop and examine the data flowing between the end computers.

This invention assumes that SSL encryption, or similar encryption protocols among those readily known by those skilled in the art, will be typically used for all secure communications between customers, aggregators and commercial web sites.

Optionally, SSL authentication may also be used to verify the identity of one or both parties involved in each communication. If both parties use public keys from digital certificates, for example, and associated private keys in conjunction with SSL to authenticate their identities with each other this is commonly referred to as SSL mutual authentication. If only one party uses a private or secret key and digital certificate for one end of an SSL session, this is commonly referred to as SSL single-end authentication.

Although this invention works best with SSL mutual authentication, it may also be used with SSL single-end authentication or even if SSL authentication is not used at all. In these cases, the parties must select some other form of verification or authentication (e.g., usernames and passwords), which should occur immediately after each SSL session is established. This invention requires that the parties involved in electronic communications, for example, have somehow verified or authenticated their identities with each other, using SSL authentication, for example, or similar techniques well-known to those skilled in the art.

Other known encryption/decryption methods will also occur to those skilled in the art, including those using symmetric, asymmetric, message digests (mathematical hashes), or other encryption schemes (including those using multiple-use or one-time use keys), for example.

Using the present invention, a tamper-resistant security document, such as an electronic document, known as a ticket, is created and approved by two consenting parties to allow a third party (or even more parties) to access private and confidential personal and financial data on the Internet (world-wide-web). The electronic ticket or other types of security documents can also have a limited lifetime, allowing the consenting parties to control the third party's duration of access.

Some of the exemplary features, objects or advantages of the present invention include:

(a) to provide an electronic document (ticket), for example, that proves that two or more parties consent to allow a third party (or more parties) secure verified access to confidential information;

(b) to create an electronic document (ticket), for example, that is very difficult (almost impossible) to forge;

(c) to create an electronic document (ticket), for example, that is very difficult (almost impossible) to modify without the creator's consent;

(d) to create an electronic document (ticket), for example, that is only useful to the intended parties—a stolen ticket can't be successfully used by a thief;

(e) to create an electronic document (ticket), for example, that eliminates, or least substantially minimizes, damaging security consequences if it is lost or stolen;

(f) to create an electronic document (ticket), for example, that only needs to be stored by a single party;

(g) to create an electronic document (ticket), for example, with a limited lifetime—the ticket can't be used after it expires;

(h) to create an electronic document (ticket), for example, whose expiration date and time ("expiration time") is agreed upon by all parties;

(i) to create an electronic document (ticket), for example, that can be used by a third party an unlimited number of times (or alternately, if desired in particular situations, for a specified limited number of times) during the ticket's lifetime;

(j) to create an electronic document (ticket), for example, containing a serial number allowing the ticket's approval and usage to be monitored and recorded for auditing purposes;

(k) to create an electronic document (ticket), for example, that allows the consenting parties to insert optional information into the ticket for subsequent, future usage; and/or (l) to create an electronic document (ticket), for example, that may be safely substituted in situations where a traditional password would normally be used.

Possible further objects and advantages are to provide an electronic document (ticket) that can be initiated by any of the three or more parties, that allows customers, for example, to use third party agents to access confidential financial and personal information in a safe and secure and verifiable manner without requiring customers to reveal confidential passwords, and that also utilizes existing Internet technologies. Other objects, advantages and features of the invention will readily occur to those skilled in the art from the following description and appended claims, taken in conjunction with the accompanying drawings.

DETAILED DESCRIPTION OF PREFERRED EMBODIMENTS

For purposes of illustration, FIGS. 1 through 4 (taken in conjunction with the following description) illustrate merely exemplary embodiments of the invention, shown in the context of a commonly-encountered customer, aggregator and bank relationship for securely communicating a customer's personal and private banking, commerce-related information or other confidential information over the Internet. One skilled in the art will readily recognize that the present invention is equally applicable to other contexts in which confidential information is securely communicated among three or more parties, and even those using communication media other than the Internet.

Figure 1A:
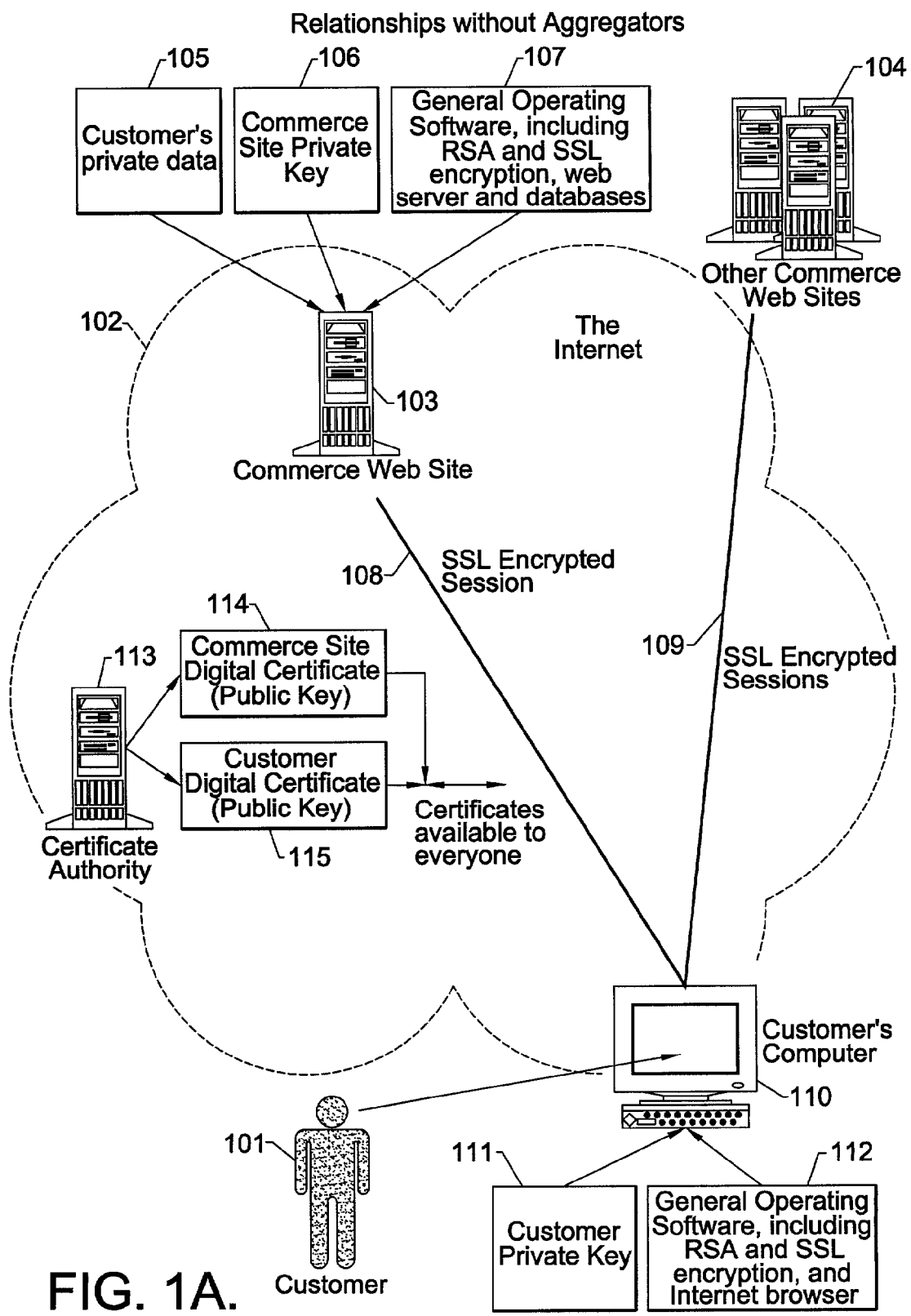
FIGS. 1A and 1B are flow diagrams showing an exemplary relationship of the entities involved in exchange of confidential information in relation to the invention.

As illustrated in FIG. 1A, commerce web sites 103, 104 provide customers 101 access to customer private or confidential data 105 using the Internet 102, standard operating software 107, 112 and computers 103, 110. Although FIG. 1A only shows one instance of customer private data 105, it is not uncommon for a customer 101 to have data scattered at many commerce web sites 103, 104.

Figure 1B:
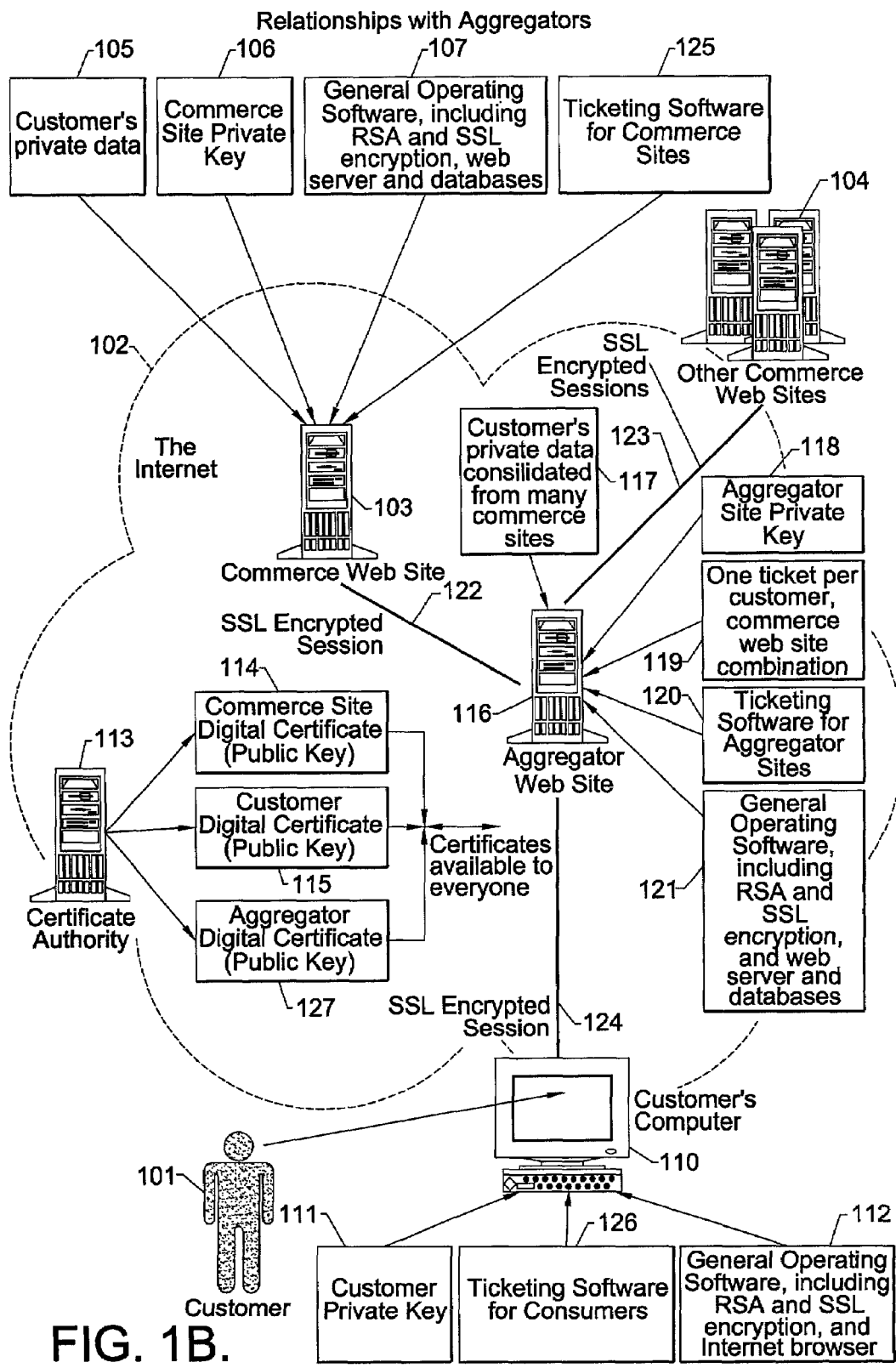

As illustrated in FIG. 1B, an aggregator's web site 116 uses the Internet 102 and standard Internet software 121 to access many commerce web sites 103, 104 on behalf of the customer 101. An aggregator 116 will access a customer's private data 105 from various commerce web sites 103, 104 and consolidate (with database software 121) the customer's private data 117 for later access by the customer 101. When a customer 101 accesses the aggregator's web site 116, his consolidated private information 117 is presented in a concise, easy-to-use fashion. A customer 101 need only access the aggregator's web site 116 to view their consolidated private or confidential information 117 originally obtained from many commerce web sites 103, 104.

Most commerce web sites 103, 104 and a customer's general operating software (such as an Internet browser) 112 use SSL encrypted sessions 108, 109 to protect confidential data as it traverses the public Internet 102. SSL uses public key cryptography, in conjunction with private keys 106, 111 and public keys (contained in digital certificates 114, 115) to authenticate the identity of one or both parties involved in each SSL session 108, 109.

Commerce web sites 103, 104 create a public/private key pair suitable for use with RSA encryption and SSL software 107, 112, for example. A commerce web site 103 also registers its public key with a certificate authority 113, who will issue a digital certificate 114 containing the public key of the commerce web site 103. Techniques for registering, sharing and processing digital certificates are well-known and are already widely available with standard Internet operating software 107, 112, and are thus not described here. The invention assumes that digital certificates 114, 115, 127, for example, and/or the public keys necessary for SSL and RSA encryption, are easily available to all parties that need access to them.

Digital certificates 114, 115, 127 and private or secret keys 106, 111, 118, for example, may be used to authenticate the identity of both parties involved in any SSL session 108, 109, 122, 123, 124 using SSL mutual authentication. Alternatively, SSL single-end authentication may be used to create an SSL session 108, 109, 122, 123, 124 if only one party possesses the necessary private key and digital certificate. Although this invention works best with SSL mutual authentication in most situations, it may also be used with SSL single-end authentication or even if SSL authentication is not used at all, provided that an alternate means to authenticate the non-SSL authenticated party is utilized. Alternate authentication means are beyond the scope of this exemplary illustration of the invention, however they typically involve some sort of password scheme.

As illustrated in FIG. 1B, this exemplary embodiment of the invention includes software 120, 125, 126 to create and process security documents or tickets 119. Although this invention was designed to use the Internet 102, more specifically, the world-wide-web technology of the Internet, it is also suitable for use when all or part of the information flows over private networks or other systems or mediums.

Software 120 at an aggregator's web site 116 sends a ticket 119 to each commerce web site 103, 104 for each access to a customer's private data 105. Ticketing software 125 at a commerce web site knows how to validate a ticket 119 presented by software 120 from an aggregator's web site 116. Once a ticket 119 is validated, the aggregator 116 is permitted access to the customer's private data 105 for the duration of the session 122. If, however, an aggregator's web site 116 doesn't have a valid ticket 119 for the specific customer 101 and commerce web site 103, 104, the aggregator's ticketing software 120 will send a ticket request to the commerce web site's ticketing software 125.

Ticketing software 125 at the commerce web site 103 creates the first part of a new ticket and digitally signs it with the commerce site's private key 106. All or part of the new ticket is then encrypted with the customer's public key 115 and sent back to the aggregator's web site 116. If the customer 101 is not already on line with the aggregator's web site, when he or she next visits the aggregator's web site 116, ticketing software 120 then forwards the encrypted, new ticket to ticketing software 126 contained in the customer's computer 110.

Ticketing software 126 in the customer's computer 110 decrypts the new ticket, validates the commerce site's digital signature against the proper digital certificate 114, and prompts the customer 101 to accept or reject the new ticket. The customer 101 can also be given a chance to adjust the ticket's expiration date and time. Based upon the customer's 101 response, the ticketing software 126 completes the ticket (including the customer's accept or reject status) and digitally signs the ticket with the customer's private key 111.

The customer's ticketing software 126 and Internet browser 112 then forwards the completed ticket from the customer's computer 110 back to the aggregator's web site 116. The aggregator ticketing software 120 then stores the ticket 119 for later use.

Figure 2A:
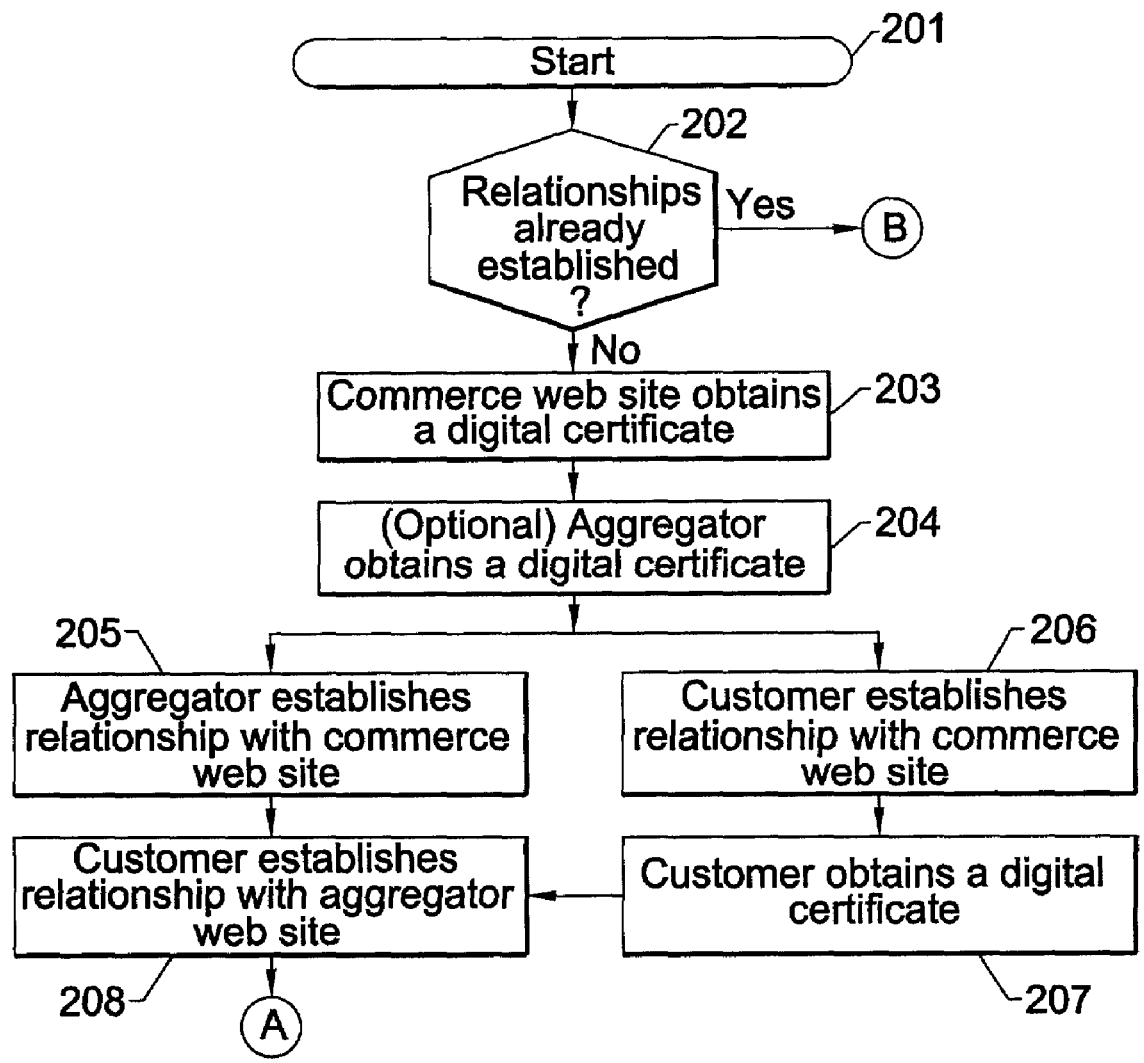
FIGS. 2A through 2F are flow diagrams showing an exemplary sequence of events performed in the context of the invention.

In FIG. 2A, a typical procedure for granting and using an exemplary ticket is described generally, but not exclusively, as set forth below.

Consumers need a way to approve aggregators' access to their various accounts without giving away their passwords. The ideal method should allow access to be easily revoked and audited. The invention contemplates the use of temporary, electronic tickets to fulfill these needs.

Tickets leverage existing Internet technology and public key cryptography to create tamper-resistant documents (tickets) which are used to approve account access. Tickets can be created by banks, brokerage firms, shopping sites and other commerce web sites, approved by customers, and given to aggregators. An aggregator's computer system then presents a ticket for each account it attempts to access.

In the detailed description of exemplary versions of the invention that follows, it is assumed that all parties have the necessary computers, hardware and software to access the Internet, utilize digital certificates, perform appropriate encryption, and process tickets utilizing methods described in this invention.

In step 201 of FIG. 2A, relationships 202 are identified and established, if not already done so as described above, between a commerce web site, an aggregator web site and a customer. These relationships need only be established once and may be skipped (proceed to step 210 in FIG. 2B) if already established. As needs change, any of the steps 202 through 209 (in FIG. 2B) may be repeated in order to update the nature of the relationships.

In step 203, a commerce web site obtains a digital certificate (if not already done) for use as an identity to create SSL encrypted sessions and digitally sign documents. Most Internet web server software includes the ability to utilize digital certificates and associated private keys.

In step 204, an aggregator's web site similarly obtains a digital certificate (if not already done) for SSL authentication. Although strongly suggested, the invention does not require that the aggregator have a digital certificate, provided that a suitable alternate means exists for the commerce web site to authenticate the identity of the aggregator.

In step 205, an aggregator must register an identity with each commerce web site that it intends to access. In most cases, this will require registering an aggregator's digital certificate with a commerce web site. Alternately, a commerce web site could issue some sort of password to each aggregator. In either case, the commerce web site must be able to identify the aggregator during each access to the commerce web site.

In step 206, before an aggregator can access a customer's data, the customer must be known by the commerce web site. Typically, this will involve the customer joining an on-line shopping site, or signing up for on-line account access with a bank or brokerage house, for example.

In step 207, the customer obtains a digital certificate from a certificate authority agreeable to both commerce and aggregator web sites, or otherwise establish an acceptable authentication among them. Preferably, commerce and aggregator web sites should be able to verify and trust the authenticity of the customer's digital certificate.

In step 208, after all other relationships have been established, a customer registers an identity at an aggregator's web site. Typically, a customer will register his, hers, or its digital certificate with the aggregator. An aggregator may also issue some sort of password to each customer, however, this does not preclude the need, at least in this example, for each customer to possess a digital certificate.

Figure 2B:
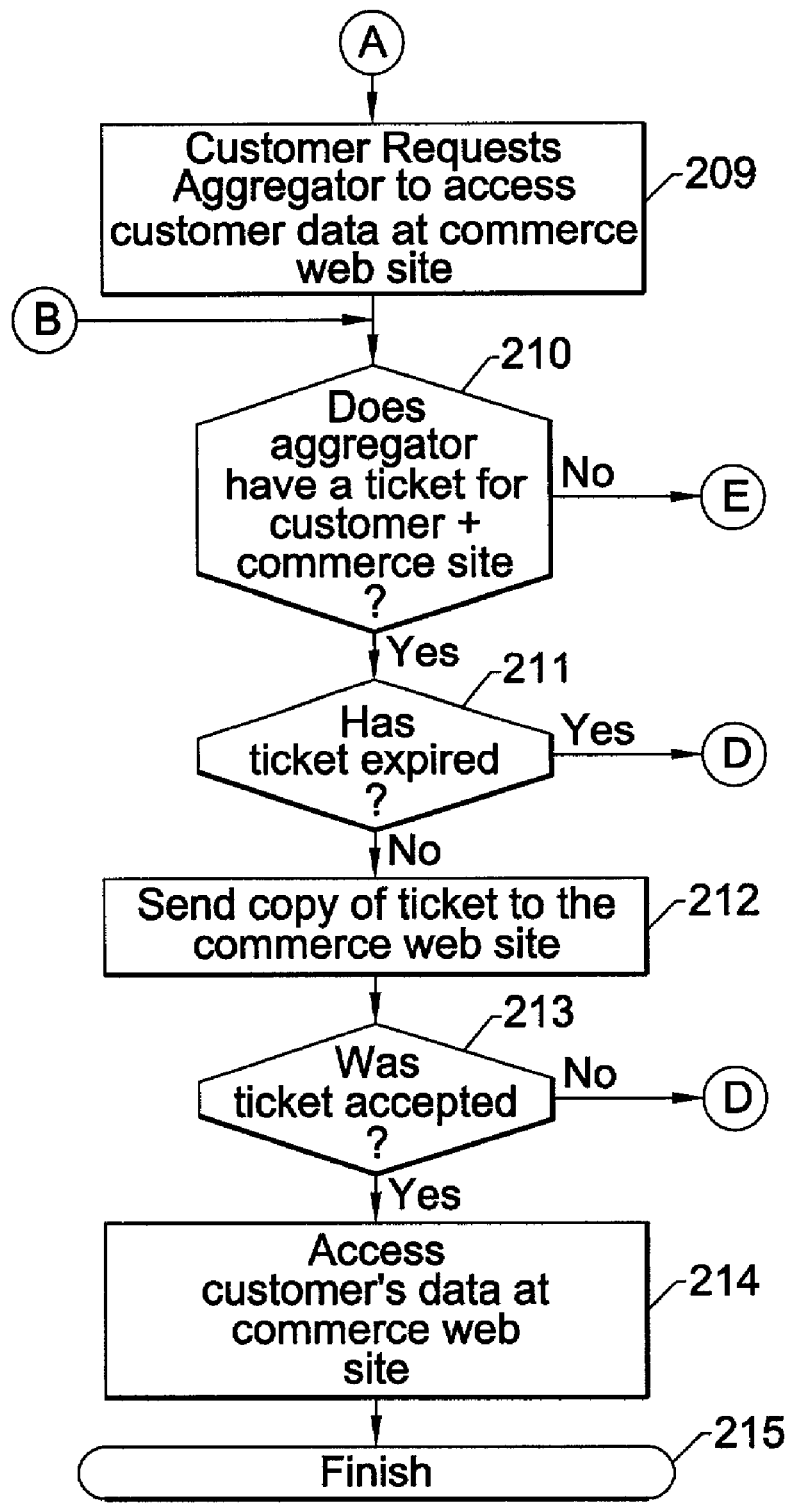

In step 209, shown in FIG. 2B, the customer will inform the aggregator about each of his or her accounts at each commerce web site that he, she, or it wants the aggregator to access. This step may be repeated when the customer adds new accounts.

Steps 210 and beyond may be performed at any time, initiated by the aggregator's site autonomously of the customer, for example, or specifically requested by the customer initially as illustrated in step 209.

Figure 2C:
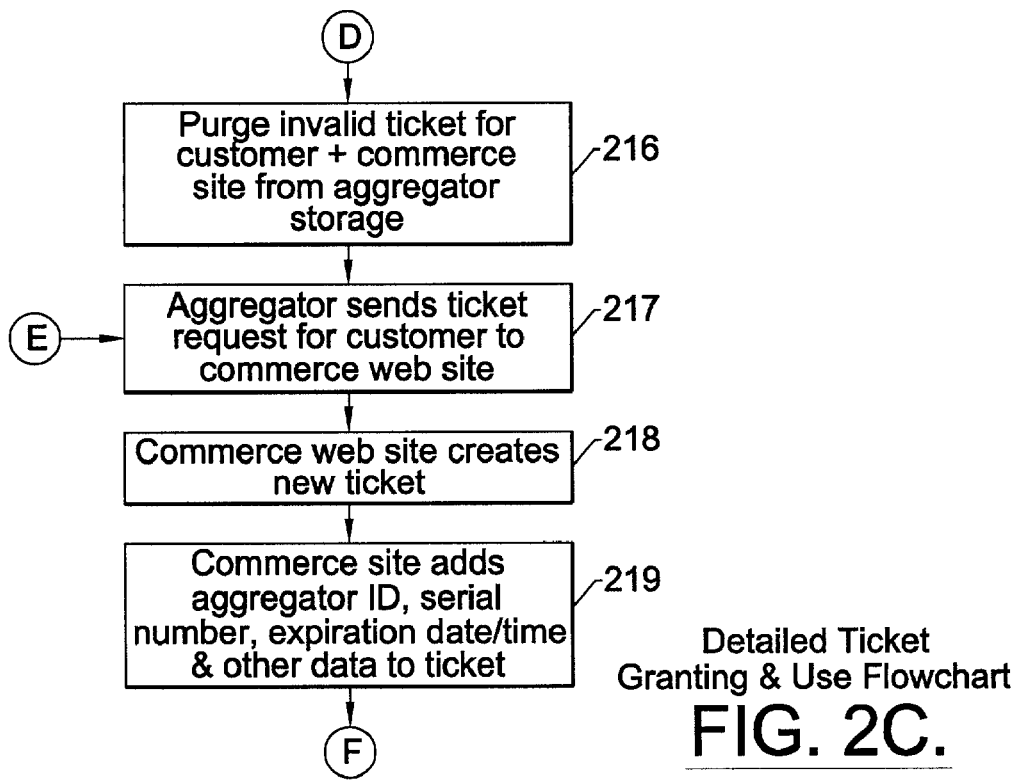

In step 210, if an aggregator has a ticket (electronic document) for a specific commerce web site, which is necessary to access a specific customer's accounts at that web site, then step 211 can be executed, otherwise, step 217 can be executed, as shown in FIG. 2C.

In step 211, a ticket optionally, but preferably, has at least two expiration date/time ("expiration time") stamps, which can be one set by the commerce web site and the other set by the customer. Using the earlier or earliest expiration date/time stamp, it can be determined if the ticket has expired. In this regard, this exemplary version of the invention assumes that all computer systems involved in ticket processing use a unified time zone, such as UCT or GMT time zone, when comparing these date/time stamps. If the ticket has expired, step 216 can be executed, as shown in FIG. 2C, otherwise step 212 can be executed.

In step 212, an aggregator sends a copy of the ticket associated with the customer's accounts to a commerce web site for approval.

In step 213, a commerce web site verifies the expiration date/time stamps, then verifies the digital signatures on the ticket. The ticket has at least two digital signatures—one for the commerce web site's portion of the ticket and another for the customer's portion of the ticket. Both digital signatures must prove or verify that both parties issued the ticket and that the ticket hasn't been tampered with. Finally, the commerce web site verifies that the ticket is associated with the aggregator requesting the account access. Assuming that all checks pass and the ticket is accepted, then step 214 can be executed, as shown in FIG. 2B. Otherwise, step 216 can be executed, as shown in FIG. 2C.

At step 214 in FIG. 2B, the commerce web site permits the aggregator to access the customer's data. Assuming that steps 202 through 209 were skipped, it was not necessary for the customer to approve this particular access by the aggregator because the aggregator possessed a valid ticket. As long as the ticket remains valid, the aggregator will typically have unencumbered access to the customer's data, without additional approval from the customer. For this reason, expiration dates and times (if used) should be set to short, reasonable values.

The aggregator might access a customer's data at the commerce web site using screen scraping techniques, for example, where the data is extracted from data streams intended (by the commerce web site) to be displayed on a customer's browser. As an incentive to use this ticketing system, aggregators might be given a more formalized data feed utilizing XML, IFX, OFX or structured records, for example.

In step 215, the aggregator closes the session with the commerce web site. Any further or future access starts over at step 201.

In step 216 of FIG. 2C, an aggregator has a ticket for a specific customer and a specific commerce web site, but it has been proven invalid. Since the ticket is no longer good, the aggregator purges it from data storage.

In step 217, an aggregator does not have a ticket for a specific customer and a specific commerce web site, so it sends a request for a new ticket to the commerce web site.

In step 218, the commerce web site creates a new ticket, which is merely a document with data fields for items on the ticket. Although not required by the invention, a document may be formatted with XML-style tags common with Internet documents.

In step 219, the commerce site adds the aggregator's identification to the ticket. Since the aggregator has authenticated with the commerce web site, the identity may be obtained from the established session. This identity is used to validate the aggregator's access in step 213 of FIG. 2B. A serial number (for auditing purposes) and the first expiration date/time ("expiration time") can also be added to the ticket. The commerce web site may optionally add other fields to the ticket for its own use.

Figure 2D:
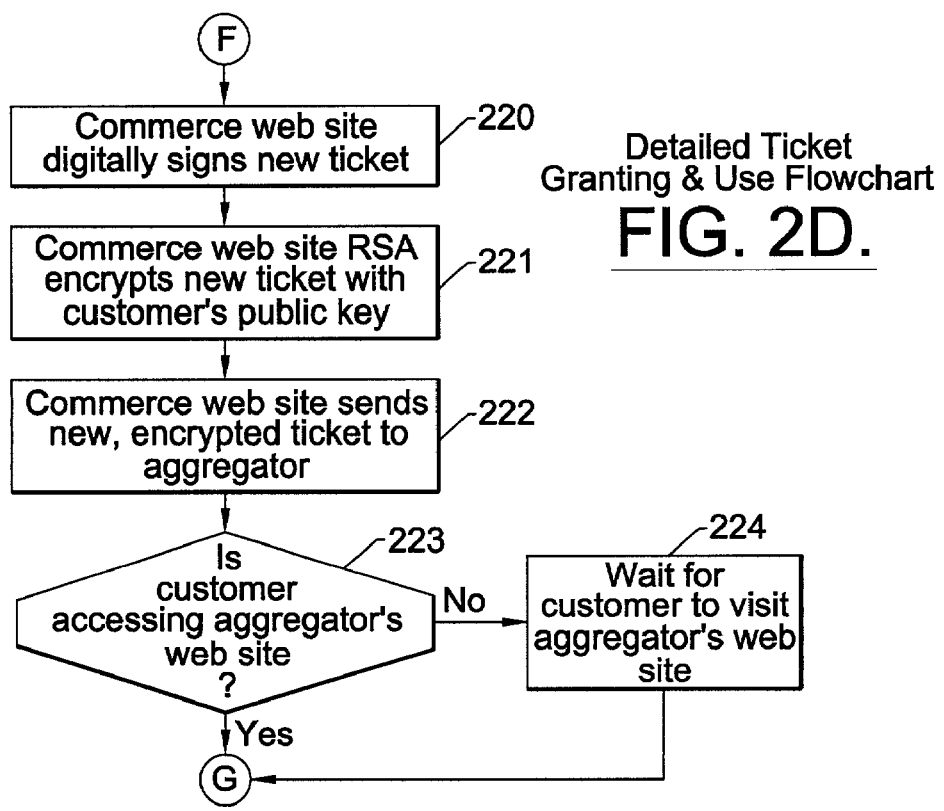

In step 220 of FIG. 2D, using the Internet standard s/MIME encoding method, for example, the commerce web site then digitally signs the new ticket. The ticket is not yet complete, however, so the signature only covers those portions created by the commerce web site. The digital signature is created with the commerce web site's private encryption key. Anyone may verify the signature by accessing the digital certificate (and public key) associated with the signature.

In step 221, using the Internet standard s/MIME encoding method, for example, the commerce web site then encrypts all or part of the new ticket using the customer's public key obtained from the customer's digital certificate. The commerce web site then forwards the new, encrypted ticket back to the aggregator in step 222.

In step 223, since only the customer has the private keys necessary to decrypt the ticket, the aggregator must forward the ticket for processing to the customer's computer system. If the customer is not currently accessing the aggregator's web site, step 224 is executed to wait for the customer. Otherwise, step 225 in FIG. 2E can be executed.

In step 224 of FIG. 2D, an aggregator has a ticket that needs to be approved by the customer and wait for the customer to access the aggregator's web site. Thus, in step 225 of FIG. 2E, the aggregator sends the new, encrypted ticket to the customer's computer system (such as by way of an Internet browser) and waits for the reply.

In step 226, ticketing software running within the customer's browser uses the customer's private encryption key to decrypt the new ticket. The software also verifies the commerce web site's digital signature and any expiration date/time stamp. In step 227, the customer is prompted to approve the ticket (see FIG. 3 for an exemplary screen view). The prompt includes enough information to identify the aggregator, the commerce web site and the desired accounts. The prompt also includes the ability for the customer to adjust (shorten) the ticket's expiration date/time ("expiration time"). The ticket will often contain a second expiration date/time stamp for the customer. Also, the date/time stamp should be encoded with a single unified time zone, such as UCT or GMT, as mentioned above. The software should accordingly adjust the displayed expiration time to the customer's local time zone. Then, in step 228, the prompt provides the customer with the ability to accept or reject the ticket requested by the aggregator (see FIG. 3).

Figure 2E:
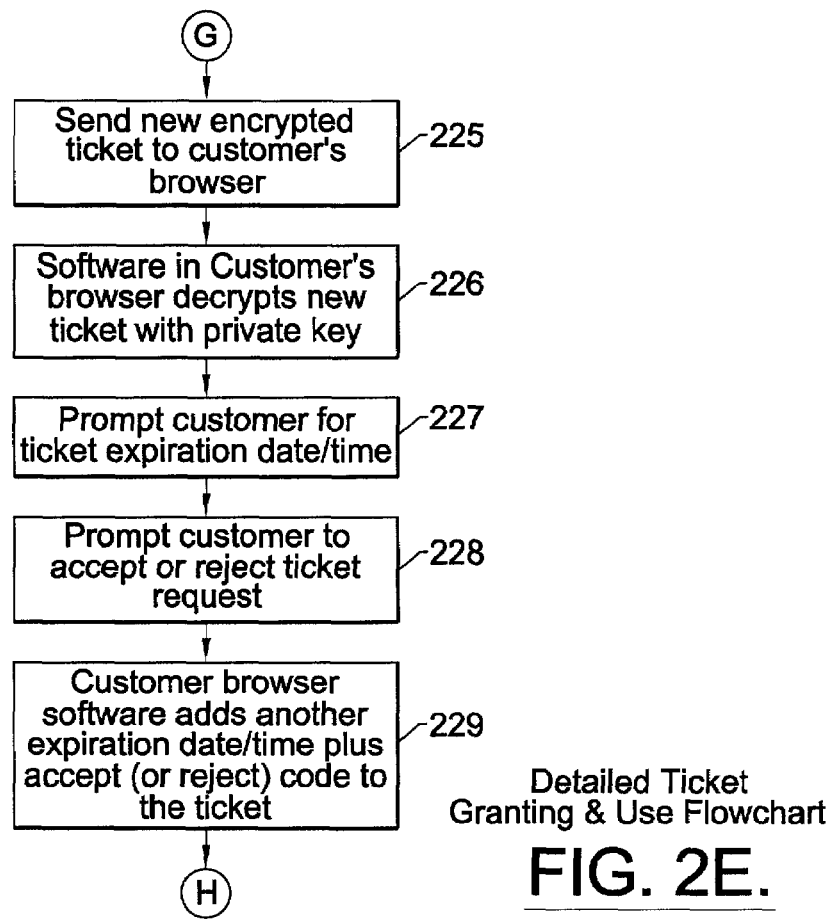
Figure 2F:
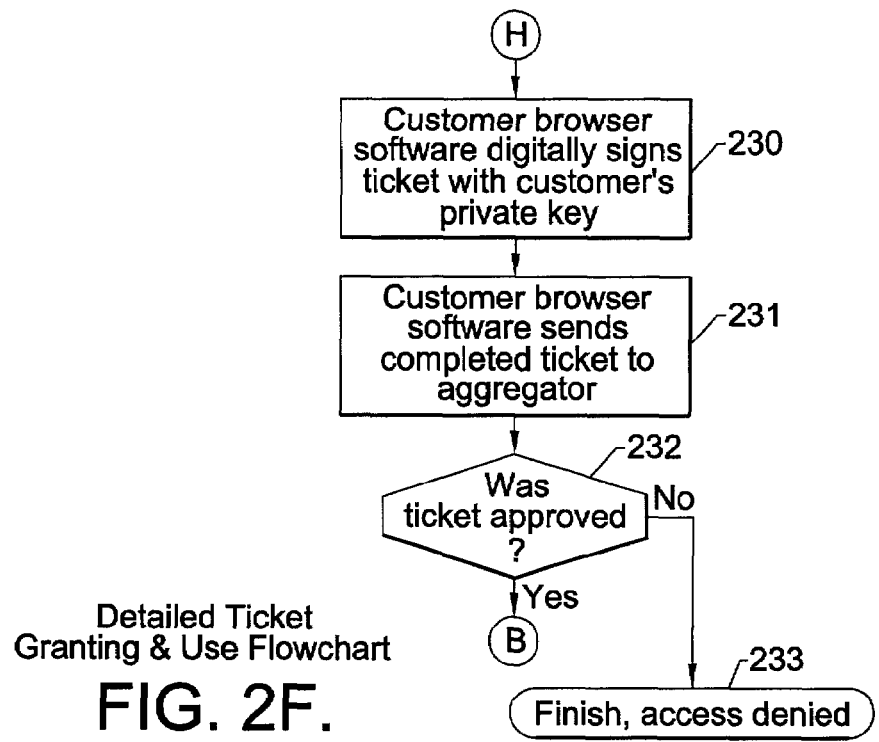

In step 229 of FIG. 2E, the ticketing software running in the customer's browser adds the second expiration date/time (if such expiration times are used in the particular application) plus the customer's accept or reject status code to the ticket. In step 230 of FIG. 2F, using the Internet standard s/MIME encoding method, for example, the ticketing software running in the customer's browser digitally signs the ticket using the customer's private encryption key. The ticketing software running in the customer's browser sends the completed ticket to the aggregator's web site n step 231.

In step 232, the aggregator can examine the accept or reject status code to determine if the ticket was approved by the customer. If the customer approved the ticket, step 210 can be executed, as shown in FIG. 2B. Otherwise, step 233 is executed, indicating that the customer has rejected the aggregator's request for a new ticket, and the aggregator may not access the customer's accounts.

Possession and storage of tickets is typically the responsibility of the aggregator. Customers and commercial web sites usually do not need to store a copy of each ticket, although they may do so for diagnostic, auditing or other purposes. If an aggregator loses a ticket, though, there is no way to replace it. The aggregator must request that a new ticket be generated.

A commercial web site need only verify the validity of a ticket in order to authenticate an aggregator's access to a customer's data. This verification typically includes checking the digital signatures on the ticket against digital certificates maintained within a public key infrastructure. The signatures help ensure the authenticity of the ticket and that the ticket has not been tampered with.

Because ticket expiration is crucial to limiting account access, commercial web sites must check both expiration times on each ticket. Typically, but not necessarily, the earliest expiration time should determine when a ticket actually expires. Dual expiration times allow a customer and commerce web site to mutually agree upon the ticket's lifetime in a secure manner.

Although the exemplary usage scenarios presented in FIGS. 2A through 2F depict a single ticket for a given customer-web site-aggregator combination, more than one ticket might be used when varying levels of access are required. For example, one ticket might permit read-only inquiries about existing account transactions; and a second ticket might permit transactions to be initiated by an aggregator. Each ticket can have space for optional information to be inserted by the commercial web site and/or the customer that may be used to determine the type of access granted to a third party.

It is expected that all confidential communications among the customer's web browser, the aggregator, and the commercial web site will typically, but not necessarily, employ industry-standard SSL encryption. However, it is not necessary to securely store or encrypt a completed ticket because the ticket is bound to, and only works with, a specific customer, aggregator and commercial web site. A stolen ticket is of little value to anyone except the aggregator. Moreover, anyone can test the validity of a ticket.

Typically, ticket data, digital signatures and ticket encryption will be encoded into computer messages using standard Internet s/MIME encoding techniques. Internet s/MIME encoding has been widely adopted by most Internet mail, web browser and web server software.

Figure 3:
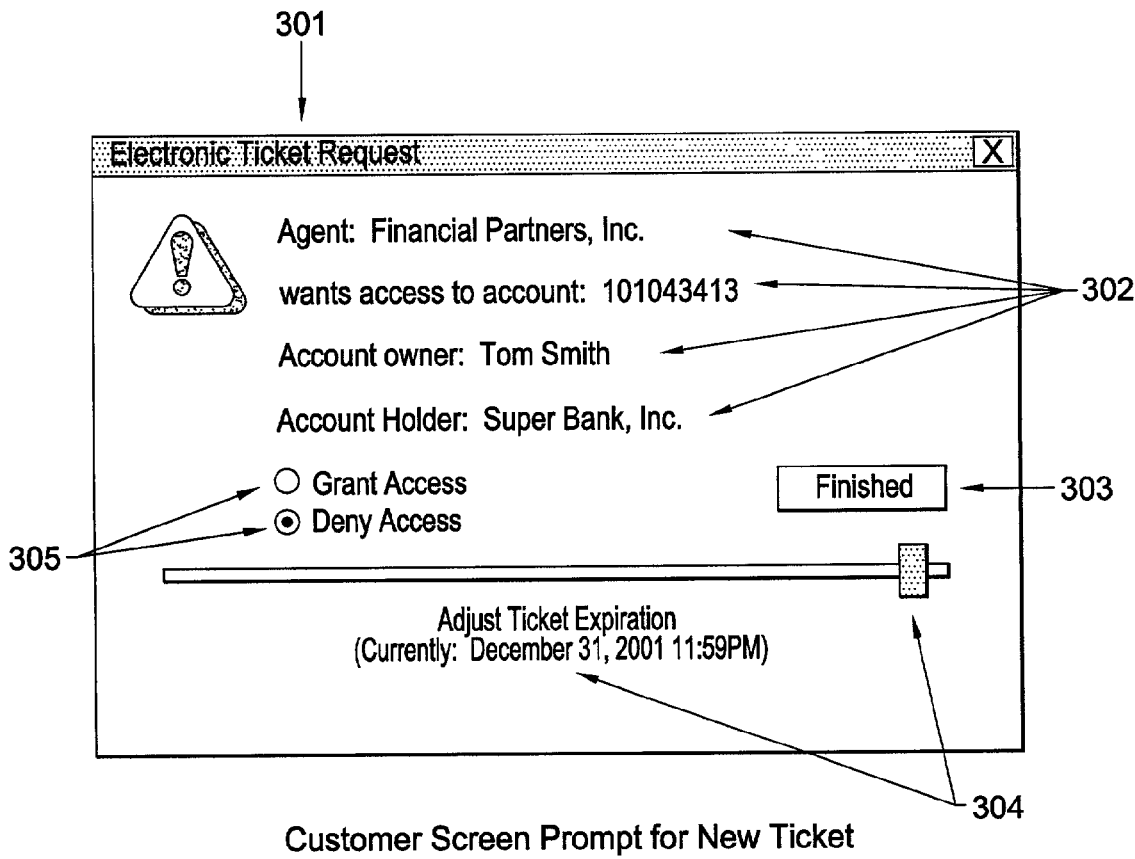
FIG. 3 is an exemplary illustration of what a customer sees on a computer screen during the approval of an electronic ticket or other such security document according to the invention.

FIG. 3 illustrates an exemplary situation where a customer prompts for a new ticket request, typically, but not exclusively, as described below. The customer is preferably given the ability to grant or deny the request and adjust the expiration time, if such times are used in a particular instance. Thus, FIG. 3 merely illustrates one example of how the customer can be prompted. Any of a wide variety of other suitable programming dialogs known to those skilled in the art can also be used.

On customer screen 301, a ticket request is usually processed and displayed by software running within a customer's Internet browser. This software may be incorporated by browser manufacturers or dynamically added to browsers with standard Internet applet technologies, such as Java or ActiveX, for example. Data fields 302 describing the parties and accounts involved with the ticket request are extracted from the ticket and displayed as part of the prompt. The customer can use a mouse (or similar pointing or other input device) to finish (close) the ticket request.

At 304, the customer may adjust the ticket expiration date/time (If such expiration times are use in the particular application) by using a slider-style control with a mouse, for example. One skilled in the art will readily recognize that other input devices can be used for this and other customer responses.

At 305, the customer chooses to either grant or deny access to the aggregator (agent). The default should typically be set to deny, so that the customer has to intentionally and affirmatively choose to grant access. When the customer chooses "Finished" at 303, the results from this screen prompt are coded into the ticket, digitally signed or otherwise authenticated by the software running in the customer's browser and returned to the aggregator's web site.

Figure 4:
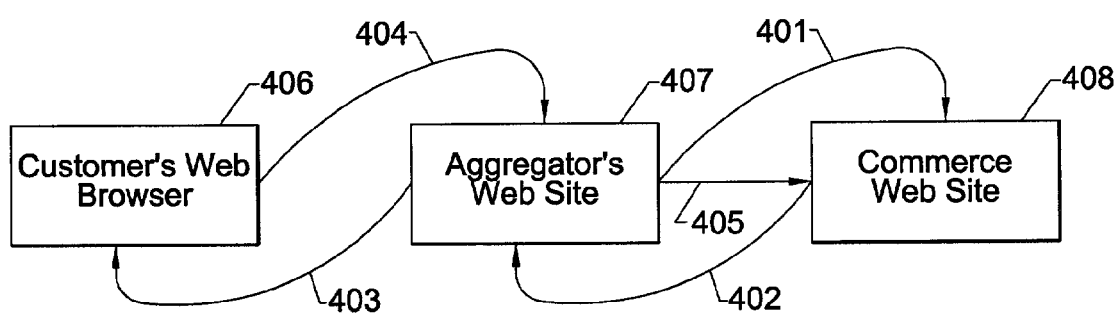
FIG. 4 is a flow diagram showing an exemplary simplified flow of a ticket's request, approval and usage between three parties (in the illustrated example): an aggregator (the requestor), a commerce web site (the originator and first approver), and a customer (the final approver).

FIG. 4 illustrates an exemplary simplified flow of the ticket processing, typically but not exclusively, as described below.

In step 401, an aggregator web site 407 requests a new ticket to access customer accounts at a commerce web site 408.

In step 402, commerce web site 408 creates a new ticket, digitally signs it, encrypts it with the customer's public key and sends it to the aggregator 407.

In step 403, aggregator's web site 407 forwards the encrypted ticket to customer's computer 406 for approval.

In step 404, web software in the customer's computer 406 decrypts the ticket, prompts the customer to adjust the expiration date/time, and prompts the customer to accept or reject the ticket request. The software then adds a second digital signature to the ticket and sends it back to the aggregator 407.

At step 405, the aggregator 407 can then use the ticket to securely access customer accounts at the commerce web site 408.

One skilled in the art will readily recognize that this exemplary ticketing system provides a reliable, secure, reusable, tamper-resistant ticket that allows at least a specific third party (aggregator) to access to private or confidential customer data at various commercial web sites without knowledge of the customer's passwords. Furthermore, each reusable ticket can be set to expire at a customer-selected expiration time or one that is mutually agreed upon by both a customer and a commercial web site. The use of this ticketing system can also promote improved auditing of aggregator's activities at commercial web sites. The exemplary ticketing system can also leverage existing Internet and encryption technologies to allow for easy implementation.

The foregoing discussion discloses, and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A method of securely communicating confidential information among at least three consenting parties, said method comprising:
   establishing a relationship among the parties;
   creating a document initiated by one of the parties;
   adding verifying information about at least two of the parties to said document in order to validate said document;
   adding an expiration time to said document in order to validate said document;
   at least one of the parties presenting said document to at least one other of the parties prior to communication of the confidential information there between; and
   said other of the parties permitting said communication of the confidential information there between only if said document is valid and said expiration time has not passed,
   wherein at least two of the parties add respective preselected expiration times to said document in order to validate said document, said other of the parties permitting said communication of the confidential information there between only if the earliest expiration time has not passed.

2. A method according to claim 1, wherein at least a portion of said document is encrypted.

3. A method according to claim 2, wherein at least a portion of said document is symmetrically encrypted.

4. A method according to claim 2, wherein at least a portion of said document is asymmetrically encrypted.

5. A method according to claim 2, wherein said encrypted information is capable of decryption using an encryption key.

6. A method according to claim 5, wherein said encryption key is a public key.

7. A method according to claim 5, wherein said encryption key is a private key.

8. A method according to claim 7, wherein said private key is a multiple-use key.

9. A method according to claim 7, wherein said private key is a one-time use key.

10. A method according to claim 2, wherein said encrypted information is encrypted with a public key and capable of decryption using a private key.

11. A method according to claim 1, wherein said document includes a digital signature of each of the parties.

12. A method of securely communicating confidential information among at least three parties, said method comprising:
    establishing an electronic communication relationship among all the parties;
    creating an electronic ticket initiated by a first of the parties;
    adding security information pertaining to said first party to said electronic ticket and then sending said electronic ticket to a second of the parties;
    adding security information pertaining to said second party to said electronic ticket and then sending said electronic ticket to a third of said parties;
    adding security information pertaining to said third party to said electronic ticket;
    validating said electronic ticket by verifying said security information pertaining to said at least three parties;
    at least one of the parties presenting said electronic ticket to another of the parties prior to communicating confidential information there between; and
    said other of the parties permitting said communication of confidential information there between only after said electronic ticket is validated,
    wherein at least two of the parties add respective preselected expiration times to said electronic ticket in order to validate said electronic ticket, said other of the parties permitting said communication of the confidential information there between only if the earliest expiration time has not passed.

13. A method according to claim 12, wherein at least part of said security information pertaining to at least two of the respective parties is symmetrically encrypted.

14. A method according to claim 12, wherein at least part of said security information pertaining to at least two of the respective parties is asymmetrically encrypted.

15. A method according to claim 12, wherein said electronic ticket includes a digital signature of at least one of the respective parties.

16. A method according to claim 12, wherein said encrypted security information pertaining to at least one of the respective parties is capable of decryption using an encryption key.

17. A method according to claim 16, wherein said encryption key is a public key.

18. A method according to claim 16, wherein said encryption key is a private key.

19. A method according to claim 18, wherein said private key is a multiple-use key.

20. A method according to claim 18, wherein said private key is a single use key.

21. A method according to claim 12, wherein each of the parties has a digital certificate, said respective parties each digitally signing said electronic ticket.

22. A method according to claim 12, wherein at least one of the parties adds a preselected expiration time to said electronic ticket, said other of the parties permitting said communication of confidential information there between only if said expiration time has not passed.

23. A method of electronically communicating secure confidential information among at least three parties, said method comprising:

establishing an electronic communication relationship among all the parties;
creating an electronic ticket initiated by a first of the parties;
adding a digital signature of the first party and encrypted security information pertaining to the first party to said electronic ticket;
adding a digital signature of the second party and encrypted security information pertaining to the second party to said electronic ticket;
adding a digital signature of the third party and encrypted security information pertaining to the third party to said electronic ticket;
validating said electronic ticket by verifying said security information pertaining to said at least three parties;
at least one of the parties presenting said electronic ticket to another of the parties prior to communicating confidential information there between; and
said other of the parties permitting said communication of confidential information there between only after said electronic ticket is validated, wherein at least two of the parties add respective preselected expiration times to said electronic ticket in order to validate said electronic ticket, said other of the parties permitting said communication of confidential information there between only if the earliest of said expiration times has not passed.

24. A method according to claim 23, wherein at least one of the parties adds a preselected expiration time to said electronic ticket in order to validate said electronic ticket, said other of the parties permitting said communication of confidential information there between only if said expiration time has not passed.

25. A method according to claim 23, wherein at least part of said electronic ticket is symmetrically encrypted.

26. A method according to claim 23, wherein at least part of said electronic ticket is asymmetrically encrypted.

27. A method for a first party to securely communicate confidential information of at least a second party with at least a third party, said method comprising the steps of:
adding encrypted security information pertaining to the first party to a security document created by one of the first, second and third parties;
requiring said security document to be presented to the first party by one of the second and third parties prior to permitting the communication of confidential information;
determining that said security document includes encrypted security information pertaining to each of the first, second and third parties in order to verify that said security document is valid; and
permitting the communication of confidential information of the second party with the third party only after verifying that said security document is valid, wherein said security document is an electronic document, said encrypted security information being added electronically, and the confidential information being communicated electronically, including the step of requiring a preselected expiration time to be added to said security document after at least one of the other parties has added another preselected expiration time, and communicating the confidential information only if the earliest expiration time has not passed.

28. A method according to claim 27, further including the step of requiring an expiration time to be added to said security document, and permitting the communication of confidential information of the second party only if said expiration time has not passed.

29. A method according to claim 28, wherein said expiration time is added electronically.

30. A method according to claim 27, wherein said expiration time is added electronically.

31. A method according to claim 27, wherein said at least a portion of said document is symmetrically encrypted.

32. A method according to claim 27, wherein said at least a portion of said document is asymmetrically encrypted.

33. A method according to claim 27, wherein said encryption information is capable of being decrypted using an encryption key.

34. A method according to claim 33, wherein said encryption key is a public key.

35. A method according to claim 33, wherein said encryption key is a private key.

36. A computer-readable medium for securely communicating confidential information among at least three consenting parties, the computer-readable medium having computer-executable instructions thereon for performing the steps of:
establishing a relationship among the parties;
creating a document initiated by one of the parties;
receiving verifying information about at least two of the parties;
adding said verifying information to said document in order to validate said document;
presenting said document from at least one of the parties to at least one other of the parties prior to communication of the confidential information there between; and
preventing said other of the parties from permitting said communication of the confidential information unless said document is valid, further comprising computer-executable instructions thereon for performing the steps of receiving and adding a preselected expiration time from each of at least two of the parties to said document in order to validate said document, and preventing said other of the parties from permitting said communication of the confidential information if the earliest expiration time has passed.

37. A computer-readable medium according to claim 36, further comprising computer-executable instructions thereon for performing the steps of receiving and adding a preselected expiration time to said document in order to validate said document, and preventing said other of the parties from permitting said communication if said expiration time has passed.

38. A computer-readable medium according to claim 36, wherein at least a portion of said document is encrypted.

39. A computer-readable medium according to claim 38, wherein at least a portion of said document is symmetrically encrypted.

40. A computer-readable medium according to claim 38, wherein said encrypted information is capable of decryption using an encryption key.

41. A computer-readable medium according to claim 40, wherein said encryption key is a public key.

42. A computer-readable medium according to claim 40, wherein said encryption key is a private key.

43. A computer-readable medium according to claim 42, wherein said private key is a multiple-use key.

44. A computer-readable medium method according to claim 42, wherein said private key is a one-time use key.

45. A computer-readable medium according to claim 36, wherein at least a portion of said document is asymmetrically encrypted.

46. A computer-readable medium according to claim 36, wherein said document includes a digital signature of each of the at least three parties.

47. A computer-readable medium for electronically communicating secure confidential information among at least three consenting parties, the computer-readable medium having computer-executable instructions thereon for performing the steps of:
 establishing an electronic communication relationship among all the parties;
 creating an electronic ticket initiated by a first of the parties;
 adding a digital signature of the first party and encrypted security information pertaining to the first party to said electronic ticket;
 adding a digital signature of the second party and encrypted security information pertaining to the second party to said electronic ticket;
 adding a digital signature of the third party and encrypted security information pertaining to the third party to said electronic ticket;
 validating said electronic ticket by verifying said security information pertaining to said at least three parties;
 presenting said electronic ticket from at least one of the parties to another of the parties prior to communicating confidential information there between;
 and preventing said other of the parties from permitting said communication of confidential information there between if said electronic ticket is not validated, further comprising computer-executable instructions thereon for performing the steps of adding a preselected expiration time from each of at least two of the parties to said electronic ticket in order to validate said electronic ticket, and preventing said other of the parties from permitting said communication of confidential information there between if the earliest of said expiration times has passed.

48. A computer-readable medium according to claim 47, further comprising computer-executable instructions thereon for performing the steps of adding a preselected expiration time from at least one of the parties to said electronic ticket in order to validate said electronic ticket, and preventing said other of the parties from permitting said communication of confidential information if said expiration time has passed.

49. A computer-readable medium according to claim 47, wherein at least part of said electronic ticket is symmetrically encrypted.

50. A computer-readable medium according to claim 47, wherein at least part of said electronic ticket is asymmetrically encrypted.

51. An apparatus for electronically communicating secure confidential information among at least three parties, said apparatus comprising:
 means for establishing an electronic communication relationship among all the parties;
 means for creating an electronic ticket initiated by a first of the parties;
 means for adding a digital signature of the first party and encrypted security information pertaining to the first party to said electronic ticket;
 means for adding a digital signature of the second party and encrypted security information pertaining to the second party to said electronic ticket;
 means for adding a digital signature of the third party and encrypted security information pertaining to the third party to said electronic ticket;
 means for validating said electronic ticket by verifying said security information pertaining to said at least three parties;
 means for presenting said electronic ticket from at least one of the parties to another of the parties prior to communicating confidential information there between; and
 means for preventing said other of the parties from permitting said communication of confidential information there between if said electronic ticket is not validated, further comprising means for adding a preselected expiration time from each of at least two of the parties to said electronic ticket in order to validate said electronic ticket, and preventing said other of the parties from permitting said communication of confidential information there between if the earliest of said expiration times has passed.

52. An apparatus according to claim 51, further comprising means for adding a preselected expiration time from at least one of the parties to said electronic ticket in order to validate said electronic ticket, and preventing said other of the parties from permitting said communication of confidential information if said expiration time has passed.

53. An apparatus according to claim 51, wherein at least part of said encrypted security information is symmetrically encrypted.

54. An apparatus according to claim 51, wherein at least part of said encrypted security information is asymmetrically encrypted.

55. A method according to claim 51, wherein said encrypted security information is capable of decryption using an encryption key.

56. A method according to claim 55, wherein said encryption key is a public key.

57. A method according to claim 55, wherein said encryption key is a private key.

58. A method according to claim 57, wherein said private key is a multiple-use key.

59. A method according to claim 57, wherein said private key is a one-time use key.

60. An apparatus for electronically communicating secure confidential information among at least three parties, said apparatus comprising:
 at least one computer having at least one processor that processes data and executes instructions, at least one data storage device that stores data, and at least one memory device that stores instructions and other data, said instructions in said memory device causing said processor to;
 establish an electronic communication relationship among all the parties;
 create an electronic ticket initiated by a first of the parties;
 add a digital signature of the first party and encrypted security information pertaining to the first party to said electronic ticket;
 add a digital signature of the second party and encrypted security information pertaining to the second party to said electronic ticket;
 add a digital signature of the third party and encrypted security information pertaining to the third party to said electronic ticket;
 validate said electronic ticket by verifying said security information pertaining to said at least three parties;
 present said electronic ticket from at least one of the parties to another of the parties prior to communicating confidential information there between; and
 prevent said other of the parties from permitting said communication of confidential information there between if said electronic ticket is not validated, wherein said instructions in said memory device further cause to add a preselected expiration time from each of at least two of the parties to said electronic ticket in order to validate said electronic ticket, and to prevent said other of the parties from permitting said communication of confidential information there between if the earliest of said expiration times has passed.

61. An apparatus according to claim 60, wherein said instructions in said memory device further cause to add a preselected expiration time from at least one of the parties to said electronic ticket in order to validate said electronic ticket, and to prevent said other of the parties from permitting said communication of confidential information if said expiration time has passed.

62. An apparatus according to claim 60, wherein at least part of said encrypted security information is symmetrically encrypted.

63. An apparatus according to claim 60, wherein at least part of said encrypted security information is asymmetrically encrypted.

64. A method according to claim 60, wherein said encrypted security information is capable of decryption using an encryption key.

65. A method according to claim 64, wherein said encryption key is a public key.

66. A method according to claim 64, wherein said encryption key is a private key.

67. A method according to claim 66, wherein said private key is a multiple-use key.

68. A method according to claim 66, wherein said private key is a one-time use key.

69. A method of securely communicating confidential information among at least three consenting parties, said method comprising:

establishing a relationship among the parties;

creating a document initiated by one of the parties;

adding verifying information about at least two of the parties to said document in order to validate said document, at least a portion of said document being encrypted;

at least one of the parties presenting said document to at least one other of the parties prior to communication of the confidential information there between; and said other of the parties permitting said communication of the confidential information there between only if said document is valid, wherein at least two of the parties add respective preselected expiration times to said document in order to validate said document, said other of the parties permitting said communication of the confidential information there between only if the earliest expiration time has not passed.

70. A method according to claim 69, further comprising adding an expiration time to said document in order to validate said document, said other of the parties permitting said communication there between only if said expiration time has not passed.

71. A method according to claim 69, wherein at least a portion of said document is symmetrically encrypted.

72. A method according to claim 69, wherein at least a portion of said document is asymmetrically encrypted.

73. A method according to claim 69, wherein said document includes a digital signature of each of the parties.

74. A method according to claim 69, wherein said encrypted information is capable of decryption using an encryption key.

75. A method according to claim 74, wherein said encryption key is a public key.

76. A method according to claim 74, wherein said encryption key is a private key.

77. A method according to claim 76, wherein said private key is a multiple-use key.

78. A method according to claim 76, wherein said private key is a one-time use key.

79. A method according to claim 69, wherein said encrypted information is encrypted with a public key and capable of decryption using a private key.

* * * * *